United States Patent
Park et al.

(10) Patent No.: US 10,886,520 B2
(45) Date of Patent: Jan. 5, 2021

(54) ELECTRODE ASSEMBLY, RECHARGEABLE BATTERY COMPRISING THE SAME AND METHOD FOR MANUFACTURING RECHARGEABLE BATTERY

(71) Applicant: LG Chem, Ltd., Seoul (KR)

(72) Inventors: Jong Pil Park, Daejeon (KR); Seung Don Choi, Daejeon (KR)

(73) Assignee: LG Chem, Ltd.

( * ) Notice: Subject to any disclaimer, the term of this patent is extended or adjusted under 35 U.S.C. 154(b) by 130 days.

(21) Appl. No.: 16/179,161

(22) Filed: Nov. 2, 2018

(65) Prior Publication Data

US 2019/0148705 A1    May 16, 2019

(30) Foreign Application Priority Data

Nov. 14, 2017    (KR) .................. 10-2017-0151399

(51) Int. Cl.
*H01M 2/26* (2006.01)
*H01M 4/76* (2006.01)
(Continued)

(52) U.S. Cl.
CPC ........... *H01M 2/263* (2013.01); *H01M 2/266* (2013.01); *H01M 4/765* (2013.01);
(Continued)

(58) Field of Classification Search
CPC ...... H01M 2/263; H01M 2/266; H01M 4/765; H01M 10/0459; H01M 10/058
(Continued)

(56) References Cited

U.S. PATENT DOCUMENTS

| | | | | |
|---|---|---|---|---|
| 2003/0064286 A1* | 4/2003 | Yoshida | ................ | H01M 2/021 429/184 |
| 2012/0121967 A1* | 5/2012 | Nakamura | ............ | H01M 10/05 429/163 |

(Continued)

FOREIGN PATENT DOCUMENTS

| CN | 105226292 A | * | 1/2016 |
|---|---|---|---|
| JP | H09213299 A | | 8/1997 |

(Continued)

*Primary Examiner* — Sean P Cullen
(74) *Attorney, Agent, or Firm* — Lerner, David, Littenberg, Krumholz & Mentlik, LLP

(57) ABSTRACT

An electrode assembly, a rechargeable battery comprising the same, and a method for manufacturing the rechargeable battery are provided. The electrode assembly comprises an electrode stack in which a plurality of electrodes and a plurality of separators are alternately combined. The electrode assembly also comprises an electrode tab part including a plurality of electrode tabs respectively connected to the plurality of electrodes to extend from a side surface of the electrode stack. The electrode tab part comprises an inclined portion provided on a first side thereof and a tab collection portion provided on a second side thereof, the inclined portion extends from the side surface of the electrode stack and bent in a direction, in which the plurality of electrode tabs are collected, and the tab collection portion extends from the inclined portion and has a shape in which the plurality of electrode tabs are joined.

14 Claims, 15 Drawing Sheets

(51) Int. Cl.
*H01M 10/04* (2006.01)
*H01M 10/058* (2010.01)

(52) U.S. Cl.
CPC ..... *H01M 10/0459* (2013.01); *H01M 10/058* (2013.01); *H01M 10/0463* (2013.01)

(58) Field of Classification Search
USPC .............................. 429/178, 179, 180, 181
See application file for complete search history.

(56) References Cited

U.S. PATENT DOCUMENTS

| 2014/0058598 A1* | 2/2014 | Matsui | H01M 4/485 |
| | | | 701/22 |
| 2015/0188116 A1* | 7/2015 | Sato | H01M 2/266 |
| | | | 429/178 |
| 2015/0188146 A1 | 7/2015 | Shinto et al. | |
| 2016/0164133 A1 | 6/2016 | Matsumoto et al. | |

FOREIGN PATENT DOCUMENTS

| JP | 2001210303 A * | 8/2001 |
| JP | 201539713 A | 3/2015 |
| KR | 20130050616 A | 5/2013 |
| KR | 10-2014-0015647 A | 2/2014 |
| KR | 10-2015-0035595 A | 4/2015 |
| KR | 20150033381 A | 4/2015 |
| KR | 10-2016-0070015 A | 6/2016 |
| KR | 10-2016-0076735 A | 7/2016 |

* cited by examiner

Related Art

Related Art

ELECTRODE ASSEMBLY, RECHARGEABLE BATTERY COMPRISING THE SAME AND METHOD FOR MANUFACTURING RECHARGEABLE BATTERY

CROSS-REFERENCE TO RELATED APPLICATIONS

This application claims priority from Korean Patent Application No. 10-2017-0151399 filed on Nov. 14, 2017, the disclosure of which is incorporated herein by reference in its entirety.

BACKGROUND

Field of the Invention

The present invention relates to an electrode assembly, a rechargeable battery comprising the same, and a method for manufacturing the rechargeable battery.

Description of the Related Art

Rechargeable batteries are capable of charging and discharging repeatedly unlike primarily batteries, and have a potential to be made in compact size and in high capacity. Thus, many studies on rechargeable batteries are being performed recently. As technology develops and demands for mobile devices increase, the demands for rechargeable batteries as energy sources are rapidly increasing. Rechargeable batteries are classified into coin type batteries, cylindrical type batteries, prismatic type batteries, and pouch type batteries based on a shape of a battery case.

FIG. 1 is a cross-sectional view of an electrode assembly and a rechargeable battery 10 comprising the electrode assembly of the related art, and FIG. 2 is a cross-sectional view illustrating when a bending phenomenon occurs at a portion connected to an electrode lead in the electrode assembly and the rechargeable battery comprising the electrode assembly of the related art. Referring to FIG. 1, in a rechargeable battery, an electrode assembly 12 mounted inside a battery case is a chargeable and dischargeable power generating device having a structure in which an electrode and a separator are stacked.

In particular, the electrode assembly 12 is typically classified into a jelly-roll type electrode assembly, a stacked type electrode assembly, and a stack/folding type electrode assembly. In the jelly-roll type electrode assembly, a separator is interposed between a positive electrode and a negative electrode, each of the positive and negative electrodes is provided as a form of a sheet coated with an active material, and the positive electrode, the separator, and the negative electrode are wound (e.g., rolled). In the stacked type electrode assembly, a plurality of positive and negative electrodes with a separator therebetween are sequentially stacked. In the stack/folding type electrode assembly, stacked type unit cells are wound together with a separation film having a substantial length.

Furthermore, the electrode assembly 12 has a plurality of electrode tabs 13 connected to a plurality of stacked electrodes. In particular, the plurality of electrode tabs 13 are collected and connected to the electrode lead 14. According to the related art, a portion into which the electrode and the plurality of electrode tabs 13 are collected has a substantial length, and thus, an accommodation part of the battery case 11, in which the electrode tabs 13 are disposed, has a substantial width a. Accordingly, energy density is decreased, and process yield is deteriorated.

Particularly, referring to FIG. 2, when a bending phenomenon occurs through the electrode lead 14 connected to the electrode tabs 13, tensile force is applied to the outermost electrode tab 13 to cause disconnection.

SUMMARY

An aspect of the present invention provides an electrode assembly capable of preventing an electrode tab from being disconnected, a rechargeable battery comprising the same, and a method for manufacturing the rechargeable battery. Another aspect of the present invention provides an electrode assembly capable of increasing energy density, a rechargeable battery comprising the same, and a method for manufacturing the rechargeable battery.

According to an aspect of the present invention, an electrode assembly may include an electrode stack in which a plurality of electrodes and a plurality of separators are alternately combined and stacked; and an electrode tab part including a plurality of electrode tabs respectively connected to the plurality of electrodes to extend from a side surface of the electrode stack. The electrode tab part includes an inclined portion provided on a first side thereof and a tab collection portion provided on a second side thereof, the inclined portion extends from the side surface of the electrode stack and bent in a direction, in which the plurality of electrode tabs are collected, to be inclined, and the tab collection portion extends from the inclined portion and has a shape in which the plurality of electrode tabs are joined. In particular, a bending angle of the outermost electrode tab of the plurality of electrode tabs disposed on the inclined portion is equal to or less than about 30 degrees with respect to a stacked direction of the electrode stack.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Figure 1:
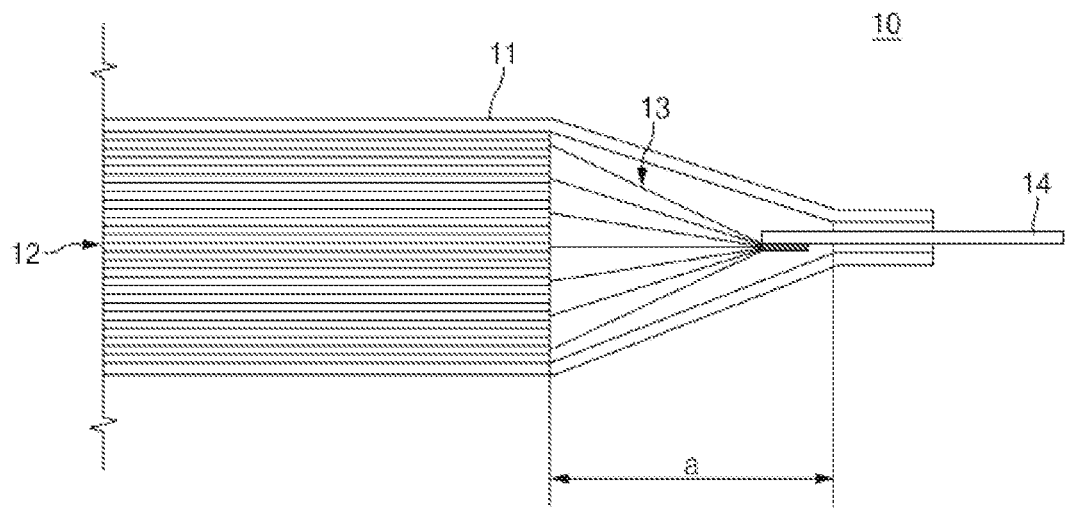
FIG. 1 is a cross-sectional view of an electrode assembly and a rechargeable battery comprising the same according to the related art.

The objectives, specific advantages, and features of the present invention will become more apparent from the following detailed description taken in conjunction with the accompanying drawings. It should be noted that the reference numerals are added to the components of the drawings in the present specification with the same numerals as possible, even though they are illustrated in separate drawings. In addition, the present invention may be embodied in different forms and should not be construed as limited to the exemplary embodiments set forth herein. In the following description of the present invention, the detailed descriptions of related arts which may unnecessarily obscure the gist of the present invention will be omitted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 3:
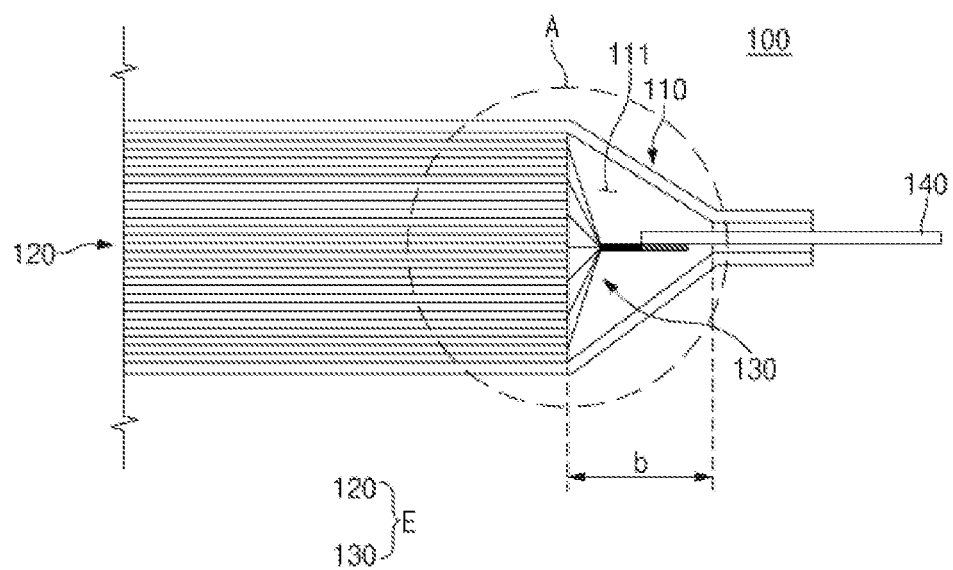
FIG. 3 is a cross-sectional view of an electrode assembly and a rechargeable battery comprising the same according to an exemplary embodiment of the present invention.
Figure 4:
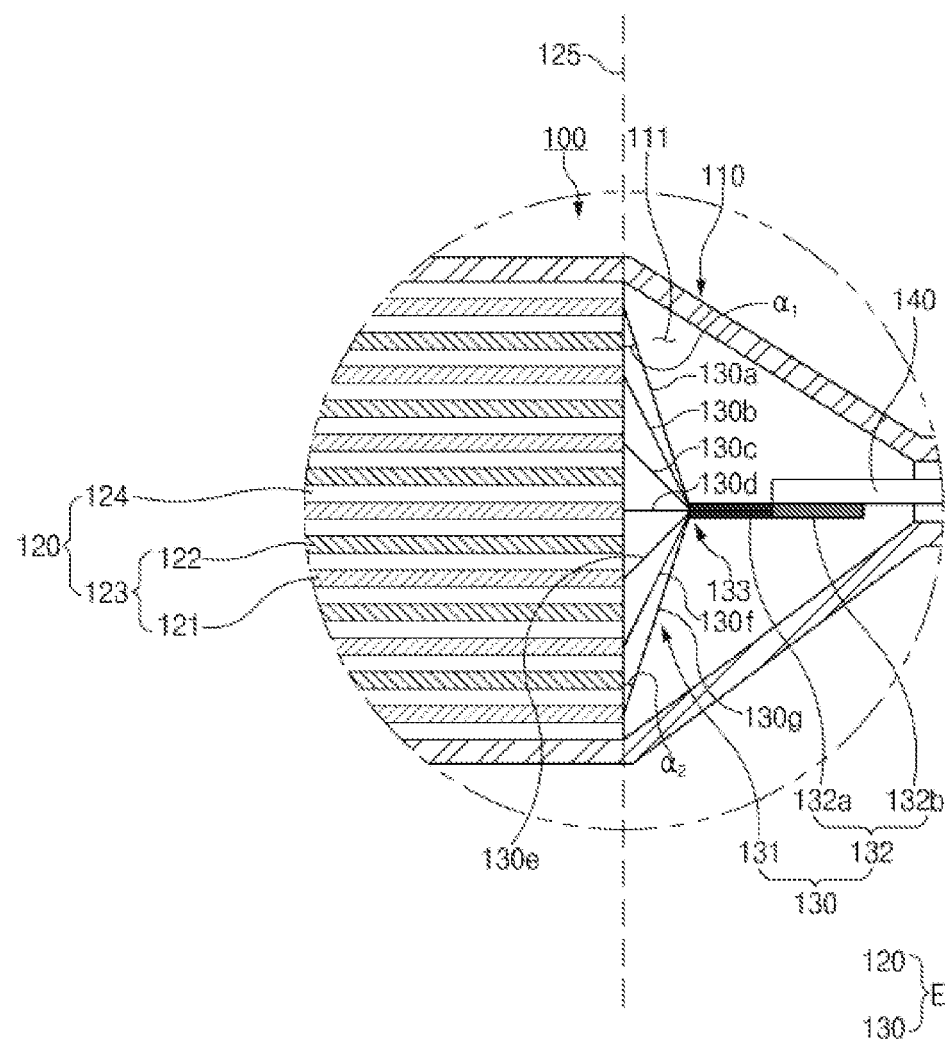
FIG. 4 is an enlarged cross-sectional view of a region A of FIG. 3 according to an exemplary embodiment of the present invention.
Figure 5:
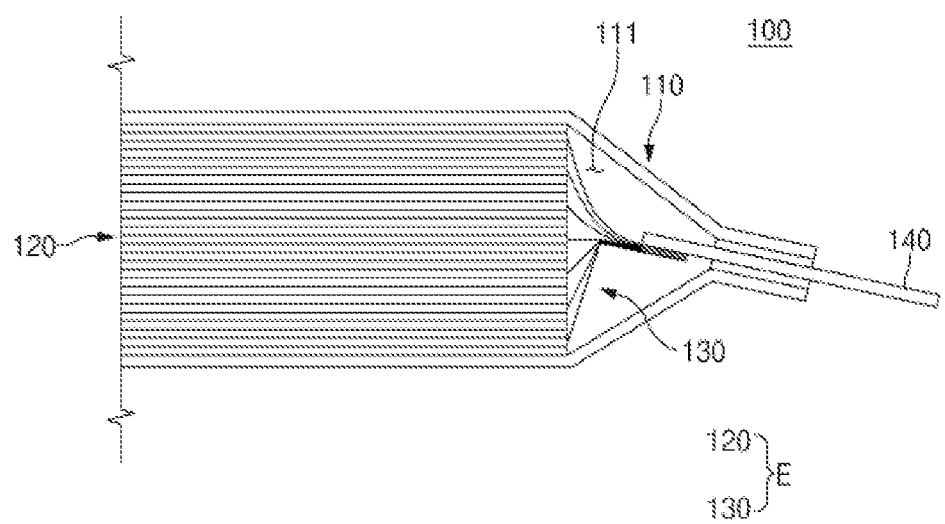
FIG. 5 is a cross-sectional view illustrating when a bending phenomenon occurs at a portion connected to an electrode lead in the electrode assembly and the rechargeable battery comprising the electrode assembly according to an exemplary embodiment of the present invention.

Referring to FIGS. 3 and 4, an electrode assembly E according to an exemplary embodiment of the present invention may include an electrode stack 120 in which a plurality of electrodes 123 and a plurality of separators 124 may be alternately stacked and an electrode tab part 130 having a plurality of electrode tabs 130*a*, 130*b*, 130*c*, 130*d*, 130*e*, 130*f*, and 130*g* connected to the plurality of electrodes 123. In particular, the electrode assembly E may be accommodated together with an electrolyte in an accommodation part 111 disposed within a battery case 110 to form a rechargeable battery 100.

Hereinafter, an electrode assembly, a rechargeable battery comprising the same, and a method for manufacturing the rechargeable battery will be described in more detail with reference to FIGS. 3 to 6. In more detail, referring to FIGS. 3 and 4, an electrode stack 120 according to an exemplary embodiment of the present invention may be a chargeable and dischargeable power generation element and may have a structure in which a plurality of electrodes 123 and a plurality of separators 124 may be combined and alternately stacked with each other.

The electrodes 123 may comprise a positive electrode 121 and a negative electrode 122. Further, the electrode stack 120 may have a structure in which the positive electrode 121, the separator 124, and the negative electrode 122 are alternately (e.g., sequentially) stacked. Each of the separators 124 may be disposed between the positive electrode 121 and the negative electrode 122 and disposed outside the outermost layers of the positive electrode 121 and the negative electrode 122. The separator 124 may be made of an insulation material to electrically insulate the positive electrode 121 from the negative electrode 122. For example, the separator 124 may be made of a polyolefin-based resin film such as polyethylene and polypropylene having micropores.

An electrode tab part 130 may include a plurality of electrode tabs 130*a*, 130*b*, 130*c*, 130*d*, 130*e*, 130*f*, and 130*g*, which are respectively connected to each of the plurality of electrodes 123 to extend from a side surface of the electrode stack 120. In addition, the electrode tab part 130 may comprise a plurality of positive electrode tabs connected to the plurality of positive electrodes 121 and a plurality of negative electrode tabs (not shown) connected to the plurality of negative electrodes 122. The plurality of electrode tabs 130*a*, 130*b*, 130*c*, 130*d*, 130*e*, 130*f*, and 130*g* may extend from one side surface or both side surfaces of the electrode stack 120.

Further, for example, each of the plurality of electrode tabs 130*a*, 130*b*, 130*c*, 130*d*, 130*e*, 130*f*, and 130*g* may be made of an aluminum (Al) or copper (Cu) material. For another example, each of the plurality of electrode tabs 130*a*, 130*b*, 130*c*, 130*d*, 130*e*, 130*f*, and 130*g* may be made of a carbon nanotube (CNT) material. Thus, each of the plurality of electrode tabs 130*a*, 130*b*, 130*c*, 130*d*, 130*e*, 130*f*, and 130*g* may be made of the carbon nanotube (CNT) material having improved conductivity, improved tensile strength, and flexibility to prevent the electrode tabs 130*a*, 130*b*, 130*c*, 130*d*, 130*e*, 130*f*, and 130*g* from being disconnected or deformed although a substantial tensile force is applied in various directions. For still another example, each of the plurality of electrode tabs 130*a*, 130*b*, 130*c*, 130*d*, 130*e*, 130*f*, and 130*g* may be made of aluminum (Al) and CNT or copper (Cu) and CNT. In more detail, for example, the positive electrode tab may be made of aluminum (Al) and CNT, and the negative electrode tab may be made of copper (Cu) and CNT.

The electrode tab part 130 may comprise an inclined portion 131 provided on a first side thereof and a tab collection portion 132 provided on a second side thereof. The inclined portion 131 may extend from the side surface of the electrode stack 120 and be bent to be inclined in a direction, in which the electrode tabs 130a, 130b, 130c, 130d, 130e, 130f, and 130g are collected with each other.

In particular, each of bending angles α1 and α2 of the outermost electrode tabs 130a and 130g may be equal to or less than about 30 degrees when measured with respect to the stacked direction 125 of the electrode stack 120. The electrode stack 120 may be, for example, stacked in a vertical direction. Accordingly, each of the bending angle α1 of the uppermost electrode tab 130a and the bending angle α2 of the lowermost electrode tab 130g may be equal to or less than about 30 degrees with respect to a vertical line that is defined as a reference line. In other words, since each of the outermost electrode tabs 130a and 130g are bent at an angle of about 30 degrees or less, the portion 133 into which the plurality of electrode tabs 130a, 130b, 130c, 130d, 130e, 130f, and 130g are collected may be disposed closer to the electrode stack 120 when compared to the case in which each of the outermost electrode tabs is bent at an angle of 60 degree or more according to the related art. Thus, referring to FIG. 5, the tensile force applied to the outermost electrode tabs 130a and 130g on the inclined portion 131 may be decreased to prevent or reduce the disconnection phenomenon.

Figure 2:
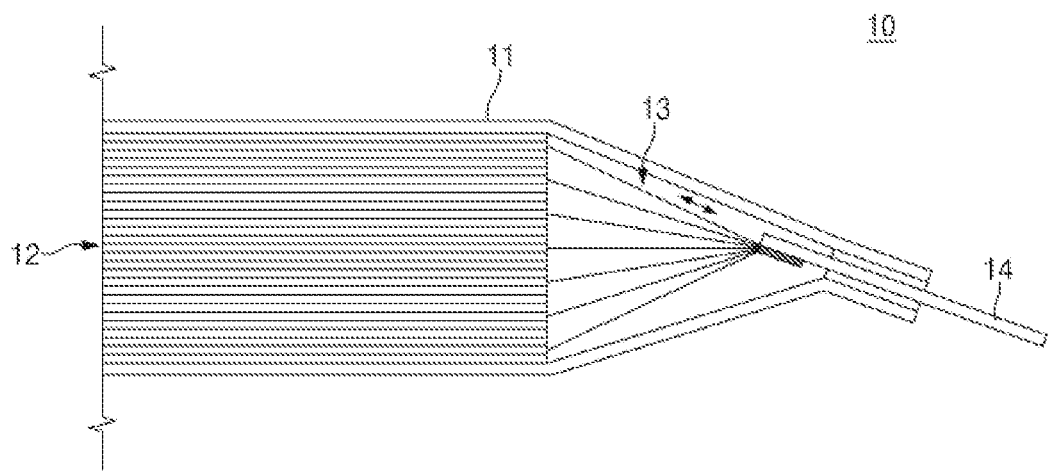
FIG. 2 is a cross-sectional view illustrating when a bending phenomenon occurs at a portion connected to an electrode lead in the electrode assembly and the rechargeable battery comprising the electrode assembly according to the related art.

In FIG. 2 of the related art, when the electrode lead 14 is bent, the tensile force is applied to the thin electrode tabs (particularly, to the outermost tabs) on the inclined portion, and thus, the electrode tabs are disconnected more easily. Conversely, in the electrode tab part 130 according to an exemplary embodiment of the present invention, when the electrode lead 140 is bent, the tensile force may be applied to the tab collection portion 132 that is longer and thicker than the short inclined portion 131 that is closely attached to the electrode stack 120, thereby preventing the disconnection. In particular, the electrode lead 140 may be attached to the tab collection portion 132 disposed to be spaced apart by a predetermined distance from the inclined portion 131 that is closely attached to the electrode stack 120, and since the inclined portion 131 is closely attached to a side of the electrode stack 120, the effect of preventing the disconnection may be achieved without requiring more space.

In addition, the electrode tab part 130 within the battery case 110 may be decreased in width to decrease a width b of a portion of the accommodation part 111 of the battery case 110, thereby increasing energy density. Furthermore, the electrode tab part 130 may have a minimal width to improve process yield.

Each of the bending angles α1 and α2 of the outermost electrode tabs 130a and 130g may range, for example, from about 1 degree to about 30 degrees when measured with respect to the stacked direction 125 of the electrode stack 120. Particularly, each of bending angles α1 and α2 of the outermost electrode tabs 130a and 130g may range, for example, from about 10 degrees to about 30 degrees when measured with respect to the stacked direction of the electrode stack 120. Further, each of bending angles α1 and α2 of the outermost electrode tabs 130a and 130g may range, for example, from about 20 degrees to about 30 degrees when measured with respect to the stacked direction of the electrode stack 120.

The tab collection portion 132 may be provided in a shape in which the plurality of electrode tabs 130a, 130b, 130c, 130d, 130e, 130f, and 130g extend from the inclined portion 131 and then are collected (e.g., combined or joined) with each other. The tab collection portion 132 may have, for example, a shape in which a first side 132a adjacent to the inclined portion 131 may be not bonded, and a second side 132b that is away from the inclined portion 131 may be bonded. Furthermore, the tab collection portion 132 may have, for another example, a shape in which both of the first side 132a adjacent to the inclined portion 131 and the second side 132b that is away from the inclined portion 131 are bonded.

Figure 6:
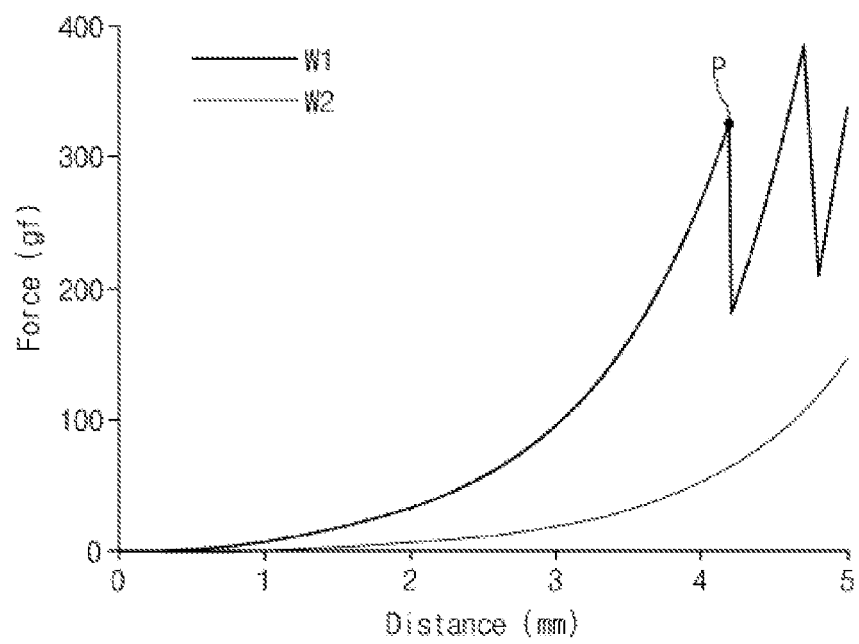
FIG. 6 is a graph comparing tensile forces applied to an electrode tab in the electrode assembly and the rechargeable battery comprising the same in the related art and in an exemplary embodiment of the present invention.

FIG. 6 is a graph comparing the tensile forces applied to the electrode tab in the electrode assembly and the rechargeable battery comprising the same according to the related art and an exemplary embodiment of the present invention. The graph of FIG. 6 illustrates the tensile force applied to each of an electrode tab W1 of the electrode assembly according to the related art and an electrode tab W2 of the electrode assembly according to an exemplary embodiment of the present invention when the electrode lead is pulled (e.g., tilted) upward.

In the graph of FIG. 6, the tensile force applied to the electrode tab W1 according to the related art is greater than the tensile force applied to the electrode tab W2 of the electrode assembly according to an exemplary embodiment of the present invention. In other words, in the electrode tab W1 according to the related art, tensile force of about 200 gf to about 400 gf is generated in a section that is spaced apart by a distance of about 4 mm to about 5 mm from the electrode stack 120. Conversely, in the electrode tab W2 according to an exemplary embodiment of the present invention, tensile force of about 50 gf to about 150 gf is generated in a section that is spaced apart by a distance of about 4 mm to about 5 mm from the electrode stack 120. In the plurality of electrode tab W1 according to the related art, the outermost electrode tab is fractured at a point P to which a tensile force of about 320 gf to about 330 gf is applied.

Figure 7:
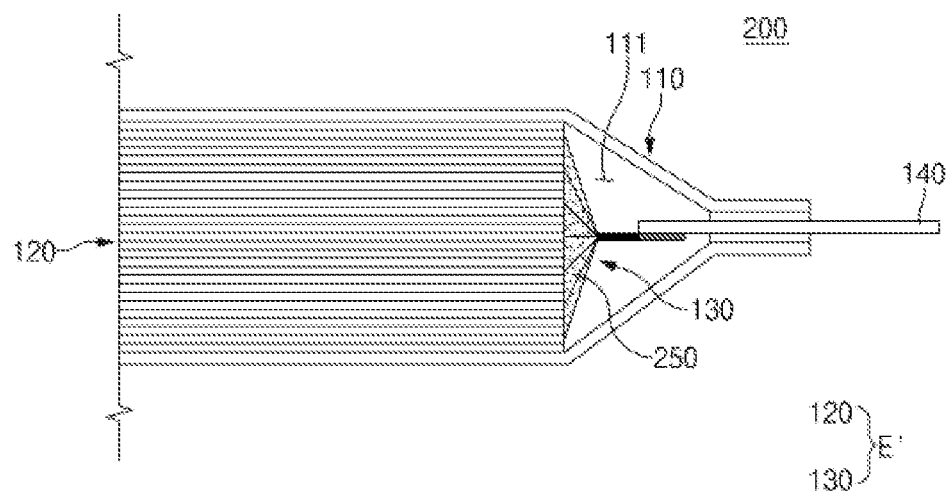
FIG. 7 is a cross-sectional view of an electrode assembly and a rechargeable battery comprising the same according to another exemplary embodiment of the present invention.

FIG. 7 is a cross-sectional view of an electrode assembly and a rechargeable battery comprising the same according to another exemplary embodiment of the present invention. Referring to FIG. 7, an electrode assembly E' according to another exemplary embodiment of the present invention may further comprise a support body 250 that supports electrode tabs 130a, 130b, 130c, 130d, 130e, 130f, and 130g. Thus, similar features will be briefly described, and differences therebetween will be mainly described.

In more detail, the electrode assembly E' according to another exemplary embodiment of the present invention may include an electrode stack 120 in which a plurality of electrodes 123 and a plurality of separators 124 are alternately stacked and an electrode tab part 130 that includes a plurality of electrode tabs 130a, 130b, 130c, 130d, 130e, 130f, and 130g connected to the plurality of electrodes 123. The electrode assembly E' may be accommodated together with an electrolyte in an accommodation part 111 provided inside a battery case 110 to form a rechargeable battery 200.

An electrode tab part 130 may include a plurality of electrode tabs 130a, 130b, 130c, 130d, 130e, 130f, and 130g, which are respectively connected to the plurality of electrodes 123 to extend from a side surface of the electrode stack 120. In addition, the electrode tab part 130 may comprise an inclined portion 131 provided on a first side thereof and a tab collection portion 132 provided on a second side thereof. The inclined portion 131 may extend from the side surface of the electrode stack 120 and be bent to be inclined in a direction, in which the electrode tabs 130a, 130b, 130c, 130d, 130e, 130f, and 130g are collected (e.g., joined) with each other. A support body 250 may be provided between the plurality of electrode tabs 130a, 130b, 130c, 130d, 130e, 130f, and 130g disposed on the inclined portion 131 to support the plurality of electrode tabs 130a, 130b, 130c, 130d, 130e, 130f, and 130g. The support body 250 may be made of silicone that is an insulative and flexible material. However, the material for the support body 250 is not limited thereto and may include other insulative and flexible materials and compositions.

Since the plurality of electrode tabs 130a, 130b, 130c, 130d, 130e, 130f, and 130g are supported by the support body 250 made of the flexible material, when the electrode lead 140 are bent to generate tensile force to the electrode tabs 130a, 130b, 130c, 130d, 130e, 130f, and 130g in various directions, the support body 250 may flexibly support the electrode tabs 130a, 130b, 130c, 130d, 130e, 130f, and 130g to prevent the electrode tabs 130a, 130b, 130c, 130d, 130e, 130f, and 130g from being deformed and disconnected.

Figure 8:
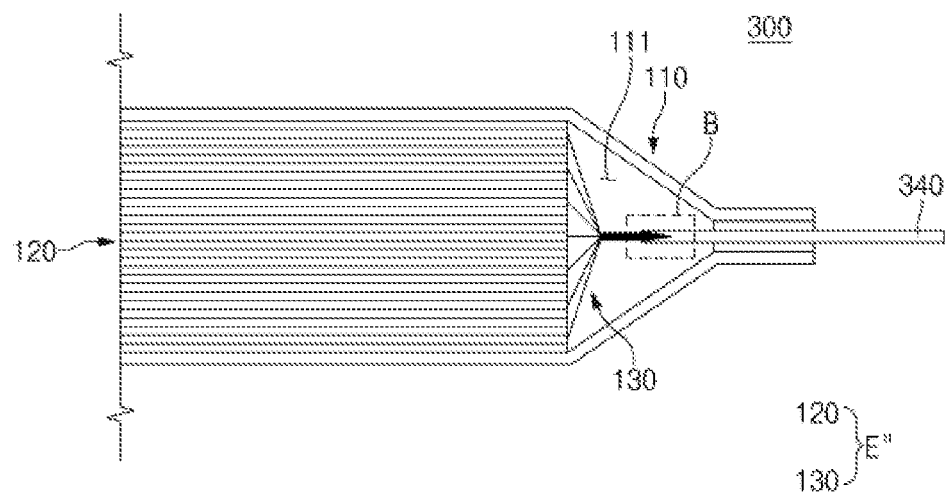
FIG. 8 is a cross-sectional view of an electrode assembly and a rechargeable battery comprising the same according to still another exemplary embodiment of the present invention.
Figure 9:
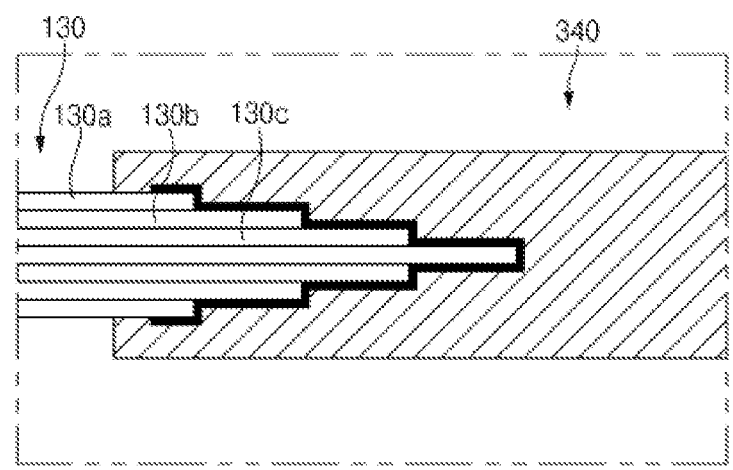
FIG. 9 is an enlarged cross-sectional view of a region B of FIG. 8.

FIG. 8 is a cross-sectional view of an electrode assembly and a rechargeable battery comprising the same according to still another exemplary embodiment of the present invention, and FIG. 9 is an enlarged cross-sectional view of a region B of FIG. 8. Referring to FIGS. 8 and 9, in the electrode assembly E" according to still another exemplary embodiment of the present invention, an end of an electrode tab part 130 may be formed in a stepped shape. In other words, in the electrode tab part 130, ends of a plurality of electrode tabs 130a, 130b, and 130c, which are disposed at the end of the tab collection portion may be terminated at different lengths, i.e., each of the plurality of electrode tabs 130a, 130b, and 130c may be mismatched to form the stepped shape.

Hereinafter, a rechargeable battery comprising the electrode assembly according to an exemplary embodiment will be described. Referring to FIGS. 3 and 4, the rechargeable battery 100 may include an electrode assembly E and a battery case 110 accommodated in the electrode assembly E. In addition, an electrode assembly E may include an electrode stack 120 in which a plurality of electrodes 123 and a plurality of separators 124 may be alternately stacked and an electrode tab part 130 including a plurality of electrode tabs 130a, 130b, 130c, 130d, 130e, 130f, and 130g connected to the plurality of electrodes 123. The rechargeable battery 100 according to an exemplary embodiment of the present invention may further comprise an electrode lead 140 connected to an electrode tab part 130.

The secondary battery according to an exemplary embodiment of the present invention may be a rechargeable battery 100 that includes the electrode assembly E according to the foregoing exemplary embodiment. Thus, similar features will be briefly described, and differences therebetween will be mainly described.

The battery case 110 may have an accommodation part 111 that accommodates the electrode assembly E and an electrolyte therein. The electrode assembly E may include an electrode stack 120 in which a plurality of electrodes 123 and a plurality of separators 124 may be alternately stacked and an electrode tab part 130 including a plurality of electrode tabs 130a, 130b, 130c, 130d, 130e, 130f, and 130g connected to the plurality of electrodes 123.

An electrode tab part 130 may include a plurality of electrode tabs 130a, 130b, 130c, 130d, 130e, 130f, and 130g, which are respectively connected to the plurality of electrodes 123 to extend from a side surface of the electrode stack 120 (see FIG. 4). The electrode tab part 130 may comprise an inclined portion 131 provided on a first side thereof and a tab collection portion 132 provided on a second side thereof. The inclined portion 131 may extend from the side surface of the electrode stack 120 and be bent to be inclined in a direction, in which the electrode tabs 130a, 130b, 130c, 130d, 130e, 130f, and 130g are joined with each other. Each of bending angles α1 and α2 of the outermost electrode tabs 130a and 130g may be less than about 30 degrees when measured with respect to the stacked direction 125 of the electrode stack 120.

The electrode lead 140 may have a first side connected to an end of the electrode tab part 130 and a second side that extends to the outside of the battery case 110. The electrode lead 140 may be fixed to the electrode tab part 130 by welding. In particular, a welding part may be provided between the electrode lead 140 and the electrode tab part 130. For example, the electrode lead 140 may be fixed to one surface of an end of the electrode tab part 130 by welding.

Referring to FIG. 7, in an rechargeable battery 200 according to another exemplary embodiment of the present invention, an electrode assembly E' of the rechargeable battery 100 according to another exemplary embodiment of the present invention may further comprise a support body 250 that supports electrode tabs 130a, 130b, 130c, 130d, 130e, 130f, and 130g.

In the rechargeable battery 200 according to another exemplary embodiment of the present invention, an electrode assembly E' may include an electrode stack 120 in which a plurality of electrodes 123 and a plurality of separators 124 may be alternately stacked and an electrode tab part 130 including a plurality of electrode tabs 130a, 130b, 130c, 130d, 130e, 130f, and 130g connected to the plurality of electrodes 123. The electrode assembly E' may be accommodated together with an electrolyte in an accommodation part 111 provided inside a battery case 110 to form the rechargeable battery 200.

The electrode tab part 130 may comprise an inclined portion 131 provided on a first side thereof and a tab collection portion 132 provided on a second side thereof. The inclined portion 131 may extend from the side surface of the electrode stack 120 and be bent to be inclined in a direction, in which the electrode tabs 130a, 130b, 130c, 130d, 130e, 130f, and 130g are joined with each other. A support body 250 may be provided between the plurality of electrode tabs 130a, 130b, 130c, 130d, 130e, 130f, and 130g disposed on the inclined portion 131 to support the plurality of electrode tabs 130a, 130b, 130c, 130d, 130e, 130f, and 130g. The support body 250 may be made of silicone that is an insulative and flexible material. However, the material for the support body 250 is not limited thereto.

Referring to FIGS. 8 and 9, in a rechargeable battery 300 according to still another exemplary embodiment of the present invention, the electrode lead 340 may be fixed to an end of an electrode tab part 130 through welding. In particular, the end of the electrode tab part 130 may be formed in a stepped shaped, and an end of a first side of the electrode lead 340 may be formed in a shape that corresponds to the stepped shape of the end of the electrode tab part 130. Thus, a contact and attachment area between the electrode tab part 130 and the electrode lead 340 may increase to reduce resistance, thereby preventing the electrode tab part 130 and the electrode lead 340 from being damaged by heat and also increasing a bonding force. Particularly, when the bending of the electrode lead 340 occurs in various directions, the electrode tab part 130 and the electrode lead 340 may be prevented from being separated from each other due to the improved bonding force therebetween.

Hereinafter, a method for manufacturing a rechargeable battery according to an exemplary embodiment of the present invention will be described. Referring to FIGS. 3 and 4, a method for manufacturing a rechargeable battery according to an exemplary embodiment of the present invention may include a preparation process of preparing an electrode tab part 130 comprising an electrode stack 120 and a plurality of electrode tabs 130a, 130b, 130c, 130d, 130e, 130f, and 130g and a tab press process of pressing and joining the electrode tabs 130a, 130b, 130c, 130d, 130e, 130f, and 130g.

The method for manufacturing the rechargeable battery according to an exemplary embodiment of the present invention may be a method for manufacturing the rechargeable battery 100 according to the foregoing exemplary embodiment. Thus, similar features will be briefly described, and differences therebetween will be mainly described.

Figure 10:
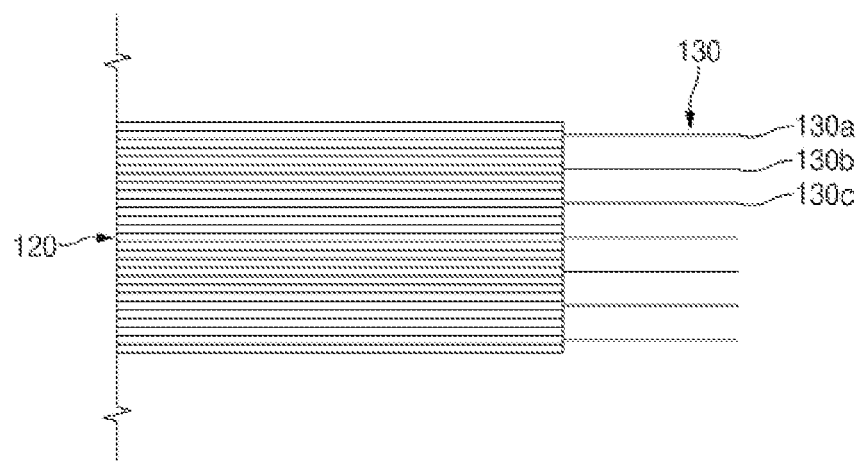
FIG. 10 is a cross-sectional view illustrating a preparation process in a method for manufacturing a rechargeable battery according to an exemplary embodiment of the present invention.
Figure 11:
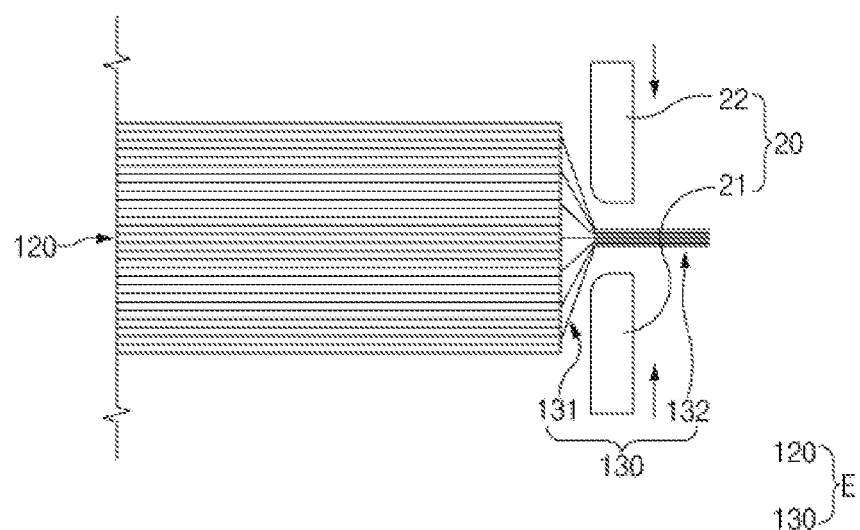
FIG. 11 is a cross-sectional view illustrating a state before an electrode tab is pressed during a tab press process in the method for manufacturing the rechargeable battery according to an exemplary embodiment of the present invention.

FIG. 10 is a cross-sectional view illustrating a preparation process in the method for manufacturing the rechargeable battery according to an exemplary embodiment of the present invention. In more detail, referring to FIGS. 4 and 10, in the preparation process, an electrode stack 120 in which a plurality of electrodes 123 and a plurality of separators 124 are alternately combined and a plurality of electrode tabs 130a, 130b, 130c, 130d, 130e, 130f, and 130g connected to the plurality of electrodes 123 may be prepared. FIG. 11 is a cross-sectional view illustrating a state before the electrode tab is pressed during a tab press process in the method for manufacturing the rechargeable battery according to an exemplary embodiment of the present invention, and FIG. 12 is a cross-sectional view illustrating a state after the electrode tab is pressed during the tab press process in the method for manufacturing the rechargeable battery according to an exemplary embodiment of the present invention.

Figure 12:
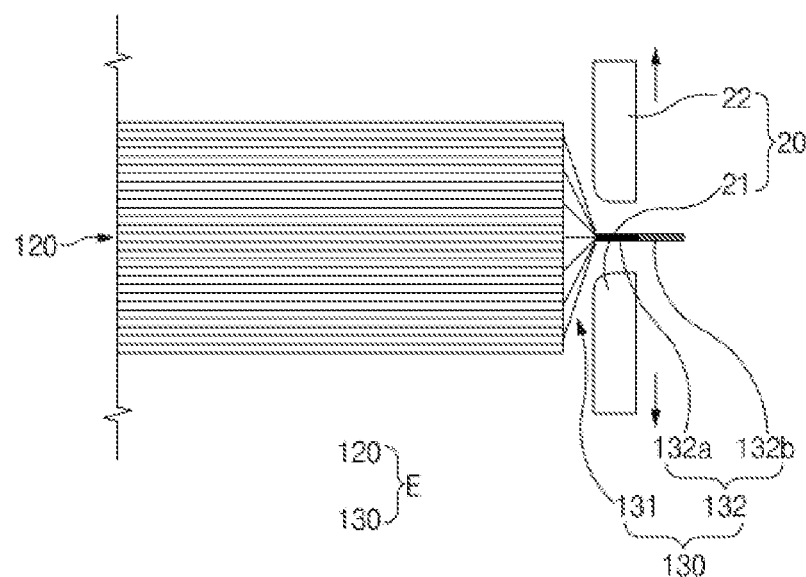
FIG. 12 is a cross-sectional view illustrating a state after the electrode tab is pressed during the tab press process in the method for manufacturing the rechargeable battery according to an exemplary embodiment of the present invention.

Referring to FIGS. 4, 11, and 12, in the tab press process, the plurality of electrode tabs 130a, 130b, 130c, 130d, 130e, 130f, and 130g may be pressed by a pressing part 20 to be joined to form an inclined portion 131 that is inclined by bending the plurality of electrode tabs 130a, 130b, 130c, 130d, 130e, 130f, and 130g and a tab collection portion 132 that extends from the inclined portion 131 to join the plurality of electrode tabs 130a, 130b, 130c, 130d, 130e, 130f, and 130g. The pressing part 20 may include a pair of pressing blocks 21 and 22 in which edges of the electrode assembly E may be rounded (e.g., filleted). In the tab press process, the plurality of electrode tabs 130a, 130b, 130c, 130d, 130e, 130f, and 130g may be pressed to be joined at both sides of the plurality of electrode tabs 130a, 130b, 130c, 130d, 130e, 130f, and 130g by using the pair of pressing blocks 21 and 22. Additionally, in the tab press process, the plurality of electrode tabs 130a, 130b, 130c, 130d, 130e, 130f, and 130g may be pressed by applying heat through the pressing part 20.

Figure 13:
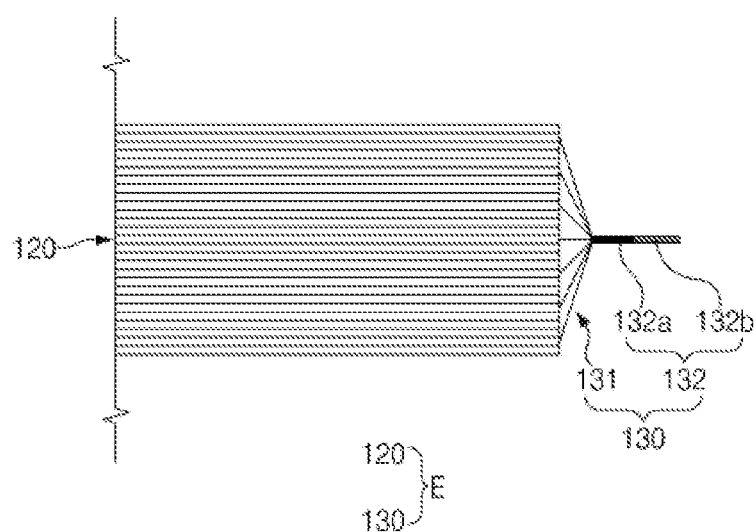
FIG. 13 is a cross-sectional view illustrating a bonding process in the method for manufacturing the rechargeable battery according to an exemplary embodiment of the present invention.

FIG. 13 is a cross-sectional view illustrating a bonding process in the method for manufacturing the rechargeable battery according to an exemplary embodiment of the present invention. Referring to FIGS. 4 and 13, the tab press process may further comprise a bonding process of bonding the plurality of electrode tabs 130a, 130b, 130c, 130d, 130e, 130f, and 130g, which are disposed on the tab collection portion 132 in the electrode tab part 130, to each other. In the tab press process, for example, the plurality of electrode tabs 130a, 130b, 130c, 130d, 130e, 130f, and 130g, which are disposed on the tab collection portion 132, may be bonded to each other on full length. For another example, the tab press process may comprise a bonding process of welding only the second side 132b to bond the plurality of electrode tabs 130a, 130b, 130c, 130d, 130e, 130f, and 130g to each other. In the tab press process, each of bending angles .alpha.1 and .alpha.2 of the outermost electrode tabs 130a and 130g may be equal to or less than about 30 degrees when measured with respect to the stacked direction 125 of the electrode stack 120.

Figure 14:
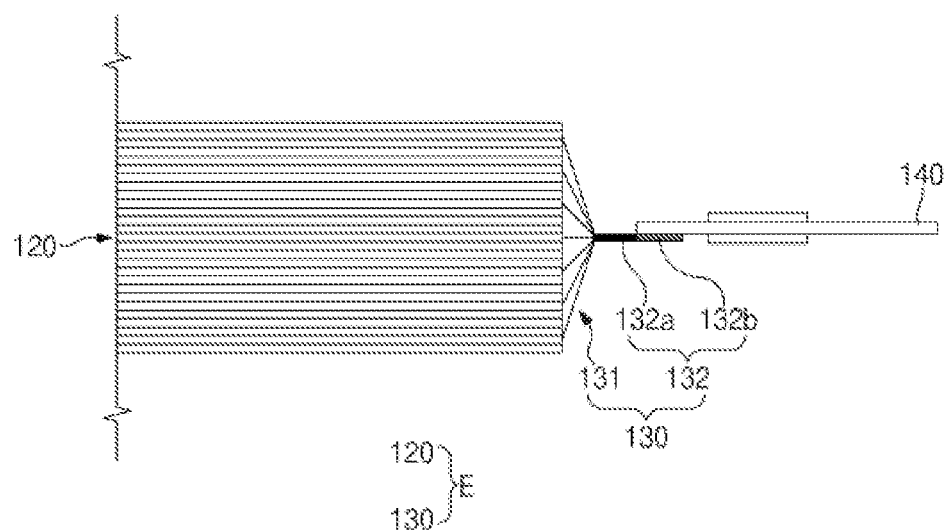
FIG. 14 is a cross-sectional view illustrating a lead fixing process in the method for manufacturing the rechargeable battery according to an exemplary embodiment of the present invention.

FIG. 14 is a cross-sectional view illustrating a lead fixing process in the method for manufacturing the rechargeable battery according to an exemplary embodiment of the present invention. Referring to FIG. 14, the method for manufacturing the rechargeable battery according to an exemplary embodiment of the present invention may further comprise a lead fixing process of welding and fixing the electrode lead 140 to the electrode tab part 130 after the tab press process. In the lead fixing process, for example, the electrode lead 140 may be fixed to one surface of an end of the electrode tab part 130 by welding.

Figure 15:
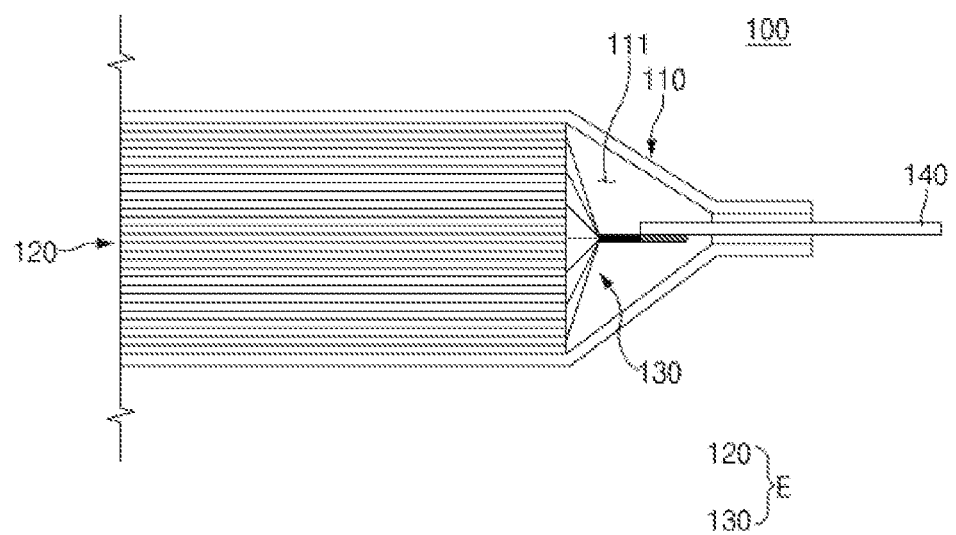
FIG. 15 is a cross-sectional view illustrating an accommodation process in the method for manufacturing the rechargeable battery according to an exemplary embodiment of the present invention.

FIG. 15 is a cross-sectional view illustrating an accommodation process in the method for manufacturing the rechargeable battery according to an exemplary embodiment of the present invention. Referring to FIG. 15, the method for manufacturing the rechargeable battery according to an exemplary embodiment of the present invention may further comprise an accommodation process of accommodating an electrode stack 120 and the electrode tab part 130 into an accommodation part 111 of a battery case 110. In the accommodation process, the electrode lead 140 may be accommodated to allow a first side of the electrode lead 140, which is attached to the electrode tab part 130, to be disposed in the accommodation part 111 of the battery case 110, and a second side of the electrode lead 140 to protrude to the outside of the battery case 110.

Referring to FIG. 7, a method for manufacturing a rechargeable battery according to another exemplary embodiment of the present invention may further comprise a support body formation process. In more detail, the method for manufacturing the rechargeable battery according to another exemplary embodiment of the present invention may further comprise the support body formation process of providing an insulation support body 250 between a plurality of electrode tabs 130a, 130b, 130c, 130d, 130e, 130f, and 130g disposed on an inclined portion 131 in an electrode tab part 130 to support the plurality of electrode tabs 130a, 130b, 130c, 130d, 130e, 130f, and 130g. In the support body formation process, the insulation support body 250 made of a silicone material may be filled into a space between the plurality of electrode tabs 130a, 130b, 130c, 130d, 130e, 130f, and 130g disposed on the inclined portion 131 (see FIG. 4). The material for the insulation support body 250 is not limited thereto.

Referring to FIGS. 8 and 9, according to the method for manufacturing the rechargeable battery according to still another exemplary embodiment of the present invention, in the lead fixing process, for example, the electrode lead 340 having an end formed in a shape that corresponds to a stepped portion formed on an end of a tab collection portion 132 may be fixed by welding. Thus, a contact and attachment area between the electrode tab part 130 and the electrode lead 340 may increase to reduce resistance, thereby preventing the electrode tab part 130 and the electrode lead 340 from being damaged by heat and also increasing the bonding force. Particularly, when the bending of the electrode lead 340 occurs in various directions, the electrode tab part 130 and the electrode lead 340 may be prevented from being separated from each other due to the strong bonding force therebetween.

According to the present invention, the external force applied to the outermost electrode tab of the plurality of electrode tabs may be reduced to prevent the electrode tab from being disconnected. Particularly, the plurality of electrode tabs may be bent to be joined. Each of the outermost electrode tabs may be bent at an angle of about 30 degrees or less with respect to the stacked direction of the electrode stack to reduce the external force applied to the outermost electrode tab. The portion into which the electrode stack and the plurality of electrode tabs are collected may be reduced in length to increase the energy density, and the electrode tab may decrease in length to improve the process yield.

While the present invention has been particularly shown and described with reference to exemplary embodiments thereof, it is to be understood that the scope of the present invention is not limited to the electrode assembly, the rechargeable battery comprising the same, and the method for manufacturing the rechargeable battery shown in the exemplary embodiments. It will be understood by those of ordinary skill in the art that various changes in form and details may be made therein without departing from the spirit and scope of the invention. Furthermore, the scope of protection of the present invention will be clarified by the appended claims.

What is claimed is:

1. An electrode assembly, comprising:
    an electrode stack in which a plurality of electrodes and a plurality of separators are alternately combined and stacked, the electrode stack having an uppermost electrode and a lowermost electrode; and
    an electrode tab part including a plurality of electrode tabs each of which has an attached end connected to a respective one of the plurality of electrodes at a side surface of the electrode stack, and a terminal end that extends away from the side surface of the electrode stack,
    wherein the electrode tab part includes an inclined portion and a tab collection portion,
    wherein the inclined portion extends from the side surface of the electrode stack and is bent toward the tab collection portion, the tab collection portion being aligned with one of the plurality of electrodes located between the uppermost electrode and the lowermost electrode,
    wherein the tab collection portion extends from the inclined portion and has a shape in which the plurality of electrode tabs are collected and joined, the shape being a plurality of steps arranged such that the terminal end of the electrode tab aligned with the one electrode extends a pre-determined distance away from the side surface of the electrode stack,
    wherein the terminal ends of each of the electrode tabs located between the uppermost electrode and the electrode tab aligned with the one electrode extends away from the side surface of the electrode stack a distance less than the pre-determined distance,
    wherein the terminal ends of each of the electrode tabs located between the lowermost electrode and the electrode tab aligned with the one electrode extends away from the side surface of the electrode stack a distance less than the pre-determined distance, and
    wherein a bending angle of the outermost electrode tab of the plurality of electrode tabs disposed on the inclined portion is equal to or less than about 30 degrees with respect to a stacked direction of the electrode stack.

2. The electrode assembly of claim 1, wherein each of the plurality of electrode tabs is made of a carbon nanotube (CNT) material.

3. The electrode assembly of claim 1, wherein the tab collection portion includes an un-bonded section adjacent the inclined portion and a bonded section spaced from the inclined portion.

4. The electrode assembly of claim 1, comprising:
    a support body disposed between the plurality of electrode tabs on the inclined portion to support the plurality of electrode tabs.

5. The electrode assembly of claim 4, wherein the support body is made of an insulative and flexible material.

6. The electrode assembly of claim 5, wherein the support body is made of a silicone material.

7. A rechargeable battery, comprising:
    an electrode assembly;
    an electrode lead; and
    a battery case that accommodates the electrode assembly therein,
    wherein the electrode assembly includes:
        an electrode stack in which a plurality of electrodes and a plurality of separators are alternately combined; and
        an electrode tab part including a plurality of electrode tabs each of which is connected to a respective one of the plurality of electrodes to extend from a side surface of the electrode stack,
    wherein the electrode tab part includes an inclined portion and a tab collection portion,
    wherein the inclined portion extends from the side surface of the electrode stack and is bent toward the tab collection portion,
    wherein the tab collection portion extends from the inclined portion and is formed by a junction of the plurality of electrode tabs, the tab collection portion including a plurality of steps forming an arrow shape having opposite sides,
    wherein the tab collection portion has an un-bonded section adjacent to the inclined portion and a bonded section spaced from the inclined portion,
    wherein the electrode lead includes a first end connected to both of the opposite sides of the arrow shaped tab collection portion only at the bonded section, and a second end that protrudes outside of the battery case, and
    wherein a bending angle of the outermost electrode tab of the plurality of electrode tabs disposed on the inclined portion is equal to or less than about 30 degrees with respect to a stacked direction of the electrode stack.

8. A method for manufacturing a rechargeable battery, comprising:
    a preparation process of preparing an electrode stack, in which a plurality of electrodes and a plurality of separators are alternately combined and an electrode tab part including a plurality of electrode tabs each of which is connected to a respective one of the plurality of electrodes; and
    a tab press process of pressing and joining the plurality of electrode tabs by a pressing part to form the electrode tab part having a bent inclined portion extending from a side surface of the electrode stack and toward a tab collection portion at which the plurality of electrode tabs are collected and joined to one another to form a plurality of steps having an arrow shape with opposite sides; and a lead fixing process of welding and fixing an electrode lead to both of the opposite sides of the arrow shaped tab collection portion, wherein, in the tab press process, a bending angle of the outermost electrode tab of the plurality of electrode tabs disposed on the inclined portion is equal to or less than about 30 degrees with respect to a stacked direction of the electrode stack.

9. The method of claim 8, wherein, in the tab press process, the plurality of electrode tabs are pressed while applying heat through the pressing part.

10. The method of claim 8,
wherein the electrode lead has an end formed in a shape that corresponds to the plurality of steps of the tab collection portion.

11. The method of claim 8, wherein the tab press process further includes a bonding process of welding the plurality of electrode tabs to each other.

12. The method of claim 8, wherein the pressing part includes a pair of pressing blocks in which edges of the electrode assembly are filleted, and in the tab press process, the plurality of electrode tabs are pressed and joined at both sides of the plurality of electrode tabs using the pair of pressing blocks.

13. The method of claim 8, further comprising:
after the tab press process, a support body formation process of forming an insulation support body between the plurality of electrode tabs disposed on the inclined portion in the electrode tab part to support the plurality of electrode tabs.

14. The method of claim 13, wherein, in the support body formation process, the insulation support body is made of a silicone material and is filled into a space between the plurality of electrode tabs disposed on the inclined portion.

* * * * *